US012583471B2

(12) United States Patent
Kuramochi et al.

(10) Patent No.: US 12,583,471 B2
(45) Date of Patent: Mar. 24, 2026

(54) VEHICLE DRIVING SUPPORT APPARATUS

(71) Applicant: SUBARU CORPORATION, Tokyo (JP)

(72) Inventors: Hiroaki Kuramochi, Tokyo (JP); Satoshi Nakano, Tokyo (JP); Masashi Okano, Tokyo (JP); Shuhei Dairokuno, Tokyo (JP); Motohiro Hidaka, Tokyo (JP); Tatsuro Suzuki, Tokyo (JP); Katsuyuki Umezawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 172 days.

(21) Appl. No.: 18/067,388

(22) Filed: Dec. 16, 2022

(65) Prior Publication Data

US 2023/0227055 A1    Jul. 20, 2023

(30) Foreign Application Priority Data

Jan. 18, 2022    (JP) ................................. 2022-005992

(51) Int. Cl.
*B60W 50/08*          (2020.01)
*B60W 30/10*          (2006.01)
          (Continued)

(52) U.S. Cl.
CPC .......... *B60W 50/082* (2013.01); *B60W 30/10* (2013.01); *B60W 30/14* (2013.01);
          (Continued)

(58) Field of Classification Search
CPC ......... B60W 2540/229; B60W 50/082; B60W 30/10; B60W 30/14; B60W 50/16;
          (Continued)

(56) References Cited

U.S. PATENT DOCUMENTS 9,199,649 B2 * 12/2015 Lazic ................... B60K 28/066
9,527,441 B2 * 12/2016 Matsumura ........... B60W 10/20
          (Continued)

FOREIGN PATENT DOCUMENTS

EP        2591942 A1 *  5/2013    ............ B60W 50/14
EP        3623261 A1 *  3/2020    ............. B62D 5/006
          (Continued)

OTHER PUBLICATIONS

EP-2591942-A1 machine translation (Year: 2013).*
          (Continued)

*Primary Examiner* — Fadey S. Jabr
*Assistant Examiner* — Mark Robert Heim
(74) *Attorney, Agent, or Firm* — Rimon P.C.

(57)          ABSTRACT

A vehicle driving support apparatus includes a forward environment recognizing device configured to recognize a traveling environment forward of a vehicle, a control device configured to perform adaptive cruise control and active lane keep centering control based on the recognized traveling environment, an electric power steering device configured to control a turning angle of wheels in a ganged manner in accordance with a steering angle received from a steering handle, and a driver monitoring system configured to detect changes in biological information of a driver who drives the vehicle. When the driver monitoring system detects a drop in alertness of the driver, the control device is configured to perform the adaptive cruise control and the active lane keep centering control and execute a steering handle idle mode that stops the electric power steering device from controlling the turning angle in the ganged manner in accordance with the steering angle.

9 Claims, 5 Drawing Sheets

(51) Int. Cl.

| | |
|---|---|
| *B60W 30/14* | (2006.01) |
| *B60W 50/16* | (2020.01) |
| *B62D 6/00* | (2006.01) |
| *B62D 5/00* | (2006.01) |
| *B62D 5/04* | (2006.01) |

(52) U.S. Cl.

CPC ............... *B60W 50/16* (2013.01); *B62D 6/00* (2013.01); *B60W 2540/221* (2020.02); *B60W 2540/229* (2020.02); *B60W 2710/20* (2013.01); *B62D 5/006* (2013.01); *B62D 5/0409* (2013.01)

(58) Field of Classification Search

CPC ..... B60W 2540/221; B60W 2540/223; B60W 30/16; B60W 50/14; B60W 2050/143; B60W 2050/146; B60W 2540/225; B60W 2710/20; B60W 30/01; B62D 5/006; B62D 5/0409; B62D 15/025; B62D 6/00

See application file for complete search history.

(56) References Cited

U.S. PATENT DOCUMENTS

| | | | | |
|---|---|---|---|---|
| 9,864,373 | B2 * | 1/2018 | Otaki ................... | B60K 28/066 |
| 9,925,872 | B1 * | 3/2018 | Alasry ................. | B60W 50/12 |
| 10,160,473 | B2 * | 12/2018 | Bodtker ................ | B62D 5/001 |
| 10,328,946 | B2 * | 6/2019 | Brooks ............ | B60W 60/0059 |
| 10,787,192 | B1 * | 9/2020 | Katzourakis ......... | B62D 5/0487 |
| 12,311,909 | B2 * | 5/2025 | Kuroda ................ | B60W 50/16 |
| 2004/0262063 | A1 * | 12/2004 | Kaufmann ........... | B62D 15/025 |
| | | | | 180/169 |
| 2005/0082107 | A1 * | 4/2005 | Husain .................. | B62D 5/006 |
| | | | | 180/402 |
| 2007/0299580 | A1 * | 12/2007 | Lin ....................... | B60W 50/16 |
| | | | | 701/41 |
| 2008/0183342 | A1 * | 7/2008 | Kaufmann ........ | B60W 60/0061 |
| | | | | 701/1 |
| 2008/0249685 | A1 * | 10/2008 | Hara ...................... | B62D 5/006 |
| | | | | 701/42 |
| 2013/0002416 | A1 * | 1/2013 | Gazit ................... | B62D 15/027 |
| | | | | 701/23 |
| 2016/0039428 | A1 * | 2/2016 | Odate ................... | B60W 50/00 |
| | | | | 701/23 |
| 2017/0088175 | A1 * | 3/2017 | Okuda ................. | B62D 15/025 |
| 2017/0232973 | A1 * | 8/2017 | Otake .................. | B60W 30/12 |
| | | | | 701/43 |

| | | | | |
|---|---|---|---|---|
| 2018/0072310 | A1 * | 3/2018 | Fung .................... | B60W 50/14 |
| 2018/0373244 | A1 * | 12/2018 | Augst ............... | B60W 60/0053 |
| 2019/0004513 | A1 * | 1/2019 | Chiba .............. | B60W 50/0097 |
| 2019/0129417 | A1 * | 5/2019 | Noto ................. | B60W 60/0053 |
| 2019/0161116 | A1 * | 5/2019 | Moreillon ............ | B62D 15/025 |
| 2019/0255995 | A1 * | 8/2019 | Friedman .............. | B60W 50/14 |
| 2019/0329791 | A1 * | 10/2019 | Oba ..................... | B60K 28/063 |
| 2019/0366844 | A1 * | 12/2019 | Yoon ........................ | A61B 5/18 |
| 2020/0148214 | A1 * | 5/2020 | Tamagaki ............... | B60R 21/00 |
| 2020/0239007 | A1 * | 7/2020 | Sobhany .............. | G05D 1/0061 |
| 2020/0264606 | A1 * | 8/2020 | Kuwahara .......... | B60W 60/007 |
| 2020/0269920 | A1 * | 8/2020 | Millsap ................. | B60W 50/10 |
| 2020/0365003 | A1 * | 11/2020 | Noro ...................... | G08B 21/06 |
| 2021/0188289 | A1 * | 6/2021 | Oba .......................... | G08G 1/00 |
| 2021/0402996 | A1 * | 12/2021 | Wang ................. | B60W 40/105 |
| 2022/0032959 | A1 * | 2/2022 | Homma ................. | B60W 10/20 |
| 2022/0081032 | A1 * | 3/2022 | Seeland ............... | B62D 15/027 |
| 2022/0111851 | A1 * | 4/2022 | An ........................ | B60W 50/16 |
| 2022/0242310 | A1 * | 8/2022 | Mauricia ........... | B60W 60/0059 |
| 2022/0396310 | A1 * | 12/2022 | Hamaguchi ........... | B62D 6/008 |
| 2023/0023426 | A1 * | 1/2023 | Hamaguchi .......... | B62D 15/025 |
| 2023/0059965 | A1 * | 2/2023 | Nakakuki ............ | H02K 11/215 |
| 2023/0166787 | A1 * | 6/2023 | Park ................... | B62D 15/0215 |
| | | | | 701/41 |
| 2023/0256819 | A1 * | 8/2023 | Tanabe .................. | B60W 50/14 |
| | | | | 180/272 |
| 2023/0271644 | A1 * | 8/2023 | Tachiiri ................. | B62D 5/046 |
| | | | | 180/444 |
| 2023/0339476 | A1 * | 10/2023 | Oba ........................ | G08G 1/00 |
| 2024/0010277 | A1 * | 1/2024 | Karve ................. | B62D 5/0457 |
| 2024/0059269 | A1 * | 2/2024 | Kuroda ............... | G06V 20/597 |

FOREIGN PATENT DOCUMENTS

| | | |
|---|---|---|
| JP | 2007-062472 A | 3/2007 |
| JP | 2009-101714 A | 5/2009 |
| JP | 2010-143382 A | 7/2010 |
| JP | 2012-252497 A | 12/2012 |
| JP | 2017-134512 A | 8/2017 |
| JP | 2017-144808 A | 8/2017 |
| JP | 2019-038471 A | 3/2019 |

OTHER PUBLICATIONS

Office Action dated Jul. 29, 2025, issued in corresponding Japanese patent application No. 2022-005992, 8 pages.
Office Action dated Jan. 6, 2026, issued in corresponding Japanese patent application No. 2022-005992.

* cited by examiner

VEHICLE DRIVING SUPPORT APPARATUS

CROSS-REFERENCE TO RELATED APPLICATIONS

The present application claims priority from Japanese Patent Application No. 2022-005992 filed on Jan. 18, 2022, the entire contents of which are hereby incorporated by reference.

BACKGROUND

The disclosure relates to a vehicle driving support apparatus that has an active lane keep centering control function and an adaptive cruise control function.

Driving support apparatuses that support driving operation of drivers who drive vehicles, such as automobiles, have been put to practical use in recent years. This is to reduce drivers' burden in driving operation and achieve improved safety.

Such a driving support apparatus has, for example, a manual driving mode where steering, acceleration, and deceleration are performed in accordance with an intentional driving operation of a driver, a driving support mode where steering support control and acceleration and deceleration control are performed on the basis of an intentional driving operation of the driver, and a driving support mode (so-called autonomous driving mode) for driving the vehicle without driver's driving operation.

Driving support control in each driving support mode is performed, for example, by an adaptive cruise control (ACC) function and an active lane keep centering (ALKC) control function. The driving support control allows the vehicle to autonomously travel in a traffic lane while keeping a distance to the preceding vehicle.

As a control technique that further improves safety, for example, Japanese Unexamined Patent Application Publication No. 2009-101714 discloses a vehicle driving support apparatus. If alertness of the driver is low, this vehicle driving support apparatus makes steering less effective, as well as applying brakes.

In the driving support apparatus of the related art, a vehicle controller performs control that makes steering less effective. Because of a large amount of force used for steering operation, the driver notices that his or her ability to drive has fallen.

SUMMARY

An aspect of the disclosure provides vehicle driving support apparatus. The vehicle driving support apparatus includes a forward environment recognizing device, a control device, an electric power steering device, and a driver monitoring system. The forward environment recognizing device is configured to recognize a traveling environment forward of a vehicle. The control device is configured to perform adaptive cruise control and active lane keep centering control based on the traveling environment recognized by the forward environment recognizing device. The electric power steering device is configured to control a turning angle of wheels of the vehicle in a ganged manner in accordance with a steering angle received from a steering handle of the vehicle. The driver monitoring system is configured to detect changes in biological information of a driver who drives the vehicle. The control device is configured such that, when the driver monitoring system detects a drop in alertness of the driver, the control device performs the adaptive cruise control and the active lane keep centering control and executes a steering handle idle mode that stops the electric power steering device from controlling the turning angle in the ganged manner in accordance with the steering angle.

An aspect of the disclosure provides vehicle driving support apparatus. The vehicle driving support apparatus includes a sensor, an electric power steering device, and circuitry. The sensor is configured to recognize a traveling environment forward of a vehicle. The electric power steering device is configured to control a turning angle of wheels of the vehicle in a ganged manner in accordance with a steering angle received from a steering handle of the vehicle. The circuitry is configured to: perform adaptive cruise control and active lane keep centering control based on the traveling environment recognized by the sensor; detect changes in biological information of a driver who drives the vehicle; and when detecting a drop in alertness of the driver, perform the adaptive cruise control and the active lane keep centering control and execute a steering handle idle mode that stops the electric power steering device from controlling the turning angle in the ganged manner in accordance with the steering angle.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In the driving support control of the related art, the steering is made less effective during operation on the basis of the alertness of the driver, so that the driver notices that his or her ability to drive has fallen. In this technique, the change in effectiveness of steering during operation is limited to a degree that does not prevent the driver from steering. Therefore, making steering less effective has been deemed insufficient to attract driver's attention.

Accordingly, it is desirable to provide a vehicle driving support apparatus by which, when a drop in alertness of the driver is detected, it is possible to attract attention of the driver to the drop in alertness while maintaining a normal traveling behavior of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, numbers of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
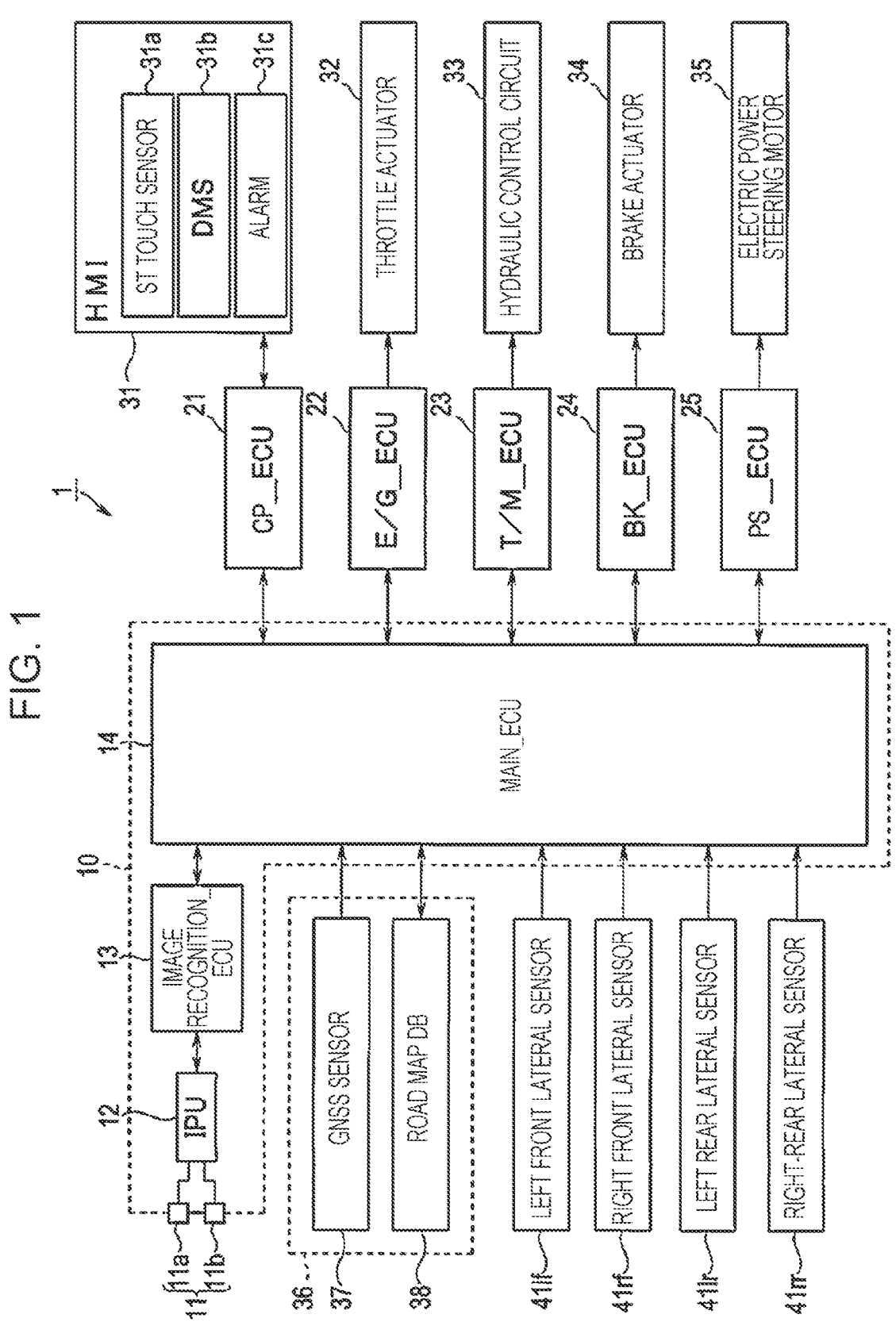
FIG. 1 is a diagram illustrating a general configuration of a vehicle driving support apparatus.

The embodiment of the disclosure will now be described with reference to the drawings. The drawings are related to one embodiment of the disclosure. FIG. 1 is a diagram illustrating a general configuration of a driving support apparatus.

As illustrated in FIG. 1, a driving support apparatus 1 includes, for example, a camera unit 10 secured to the center of a front upper part of the interior of a vehicle M. In one embodiment, the camera unit 10 may serve as a "forward environment recognizing device".

The camera unit 10 includes a stereo camera 11, an image processing unit (IPU) 12, an image recognition unit (image recognition_ECU) 13, and a main controller (main_ECU) 14 serving as a traveling control unit which is a main traveling control device.

Figure 2:
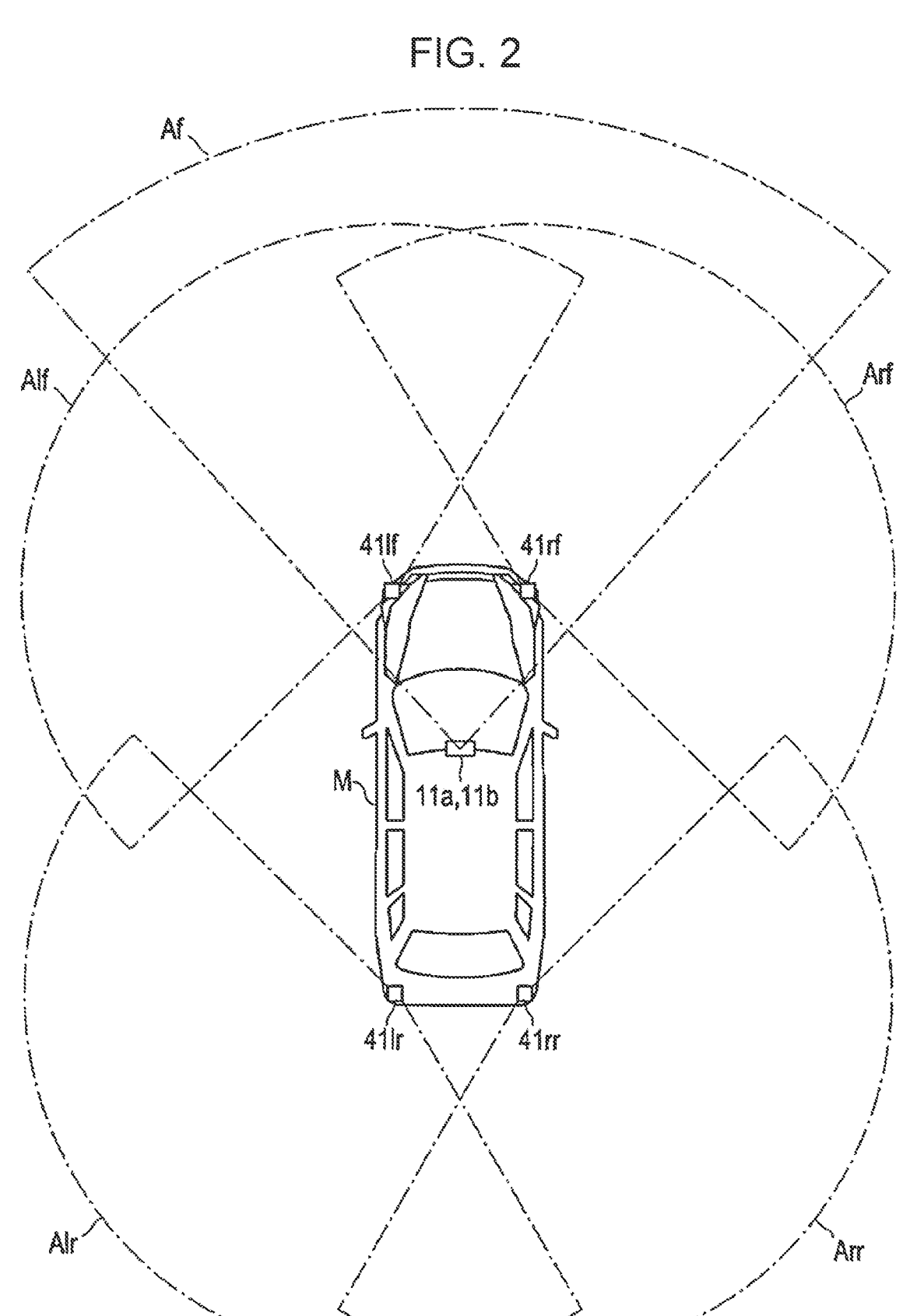
FIG. 2 is an explanatory diagram illustrating areas monitored by a stereo camera, and radars.

The stereo camera 11, which is a forward environment recognizing camera, includes a main camera 11a and a sub-camera 11b. For example, the main camera 11a and the sub-camera 11b are symmetrically arranged right and left, with the center of the vehicle M in the width direction therebetween. The main camera 11a and the sub-camera 11b each include, for example, a complementary metal oxide semiconductor (CMOS) sensor. The main camera 11a and the sub-camera 11b stereoscopically capture a traveling environment in an area Af (see FIG. 2) in front of the vehicle M from different viewpoints, at predetermined intervals synchronized with each other.

The traveling environment images captured by the stereo camera 11 are processed in a predetermined method by the IPU 12. The IPU 12 detects the edges of various objects, such as three-dimensional objects and lane lines on the road surface, appearing in the images. The IPU 12 determines range information from the amount of positional displacement between corresponding edges in the right and left images, and generates image information (range image information) including the range information.

On the basis of the range image information received from the IPU 12, for example, the image recognition_ECU 13 determines the road curvature (1/m) of the right and left lane lines defining the traveling path (vehicle traveling path) along which the vehicle M travels, and also determines the distance between the right and left lane lines (lane width).

Various ways of determining the road curvature and the lane width are known. For example, to determine the road curvature, the image recognition_ECU 13 binarizes the traveling environment information by using a luminance difference to recognize the right and left lane lines, and solves a curve approximation equation using the least squares method to determine the curvature of the right and left lane lines for each predetermined section. Also, the image recognition_ECU 13 calculates the lane width from a difference in curvature between the right and left lane lines.

Then, on the basis of the curvature of the right and left lane lines and the lane width, the image recognition_ECU 13 calculates, for example, the lane center and the vehicle's lateral deviation, which is the distance from the lane center to the center of the vehicle M in the vehicle width direction.

Also, the image recognition_ECU 13 performs, for example, predetermined pattern matching on the range image information to recognize three-dimensional objects, such as nearby vehicles and guardrails and curbs along the road.

To recognize a three-dimensional object, the image recognition_ECU 13 recognizes, for example, the type of the three-dimensional object, the height of the three-dimensional object, the distance to the three-dimensional object, the moving speed of the three-dimensional object, and a relative speed between the three-dimensional object and the vehicle M.

These various types of information recognized by the image recognition_ECU 13 are output as traveling environment information to the main_ECU 14.

In the present embodiment, along with the stereo camera 11 and the IPU 12, the image recognition_ECU 13 serves as a traveling environment recognizer that recognizes information about a traveling environment outside the vehicle M.

The main_ECU 14 is a control unit for controlling the overall operation of the driving support apparatus 1.

The main_ECU 14 is coupled to various control units through an in-vehicle communication network, such as a controller area network (CAN). The control units include a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25.

The main_ECU 14 is also coupled to various sensors including a locator unit 36, a left-front lateral sensor 41lf and a right-front lateral sensor 41rf that are each a traveling environment recognizing sensor on the front side, and a left-rear lateral sensor 41lr and a right-rear lateral sensor 41rr each serving as a rearward environment recognizing device which is a traveling environment recognizing sensor on the rear side. In one embodiment, the left-front lateral sensor 41lf and a right-front lateral sensor 41rf may each serv3 as a "forward environment recognizing device".

The CP_ECU 21 is coupled to a human machine interface (HMI) 31 disposed around a driving seat.

The HMI 31 includes, for example, switches used to instruct execution of various types of driving support control, a mode selection switch for switching the driving support mode, a steering touch sensor 31a configured to detect the steering-holding state of the driver, a driver monitoring system (DMS) 31b configured to perform face recognition of the driver and detect the driver's line of sight, an alarm 31c, a touch panel display, a combination meter, and a speaker. In one embodiment, the alarm 31c may serve as a "warning device".

Upon receiving a control signal from the main_ECU 14, the CP_ECU 21 appropriately provides various types of displayed or audio information through the HMI 31 to the driver. The information provided to the driver includes, for example, various warnings about the presence of the preceding vehicle, the state of implementation of driving support control, and various types of information about the traveling environment of the vehicle M.

The CP_ECU 21 outputs, to the main_ECU 14, various types of input information received from the driver through the HMI 31. The input information includes, for example, an on/off state of each driving support control.

The E/G_ECU 22 is coupled on the output side thereof to a throttle actuator 32 for actuating an electronically controlled throttle. The E/G_ECU 22 is coupled on the input side thereof to various sensors including an accelerator sensor (not illustrated).

The E/G_ECU 22 drives and controls the throttle actuator 32 on the basis of a control signal from the main_ECU 14 or detection signals from various sensors. The E/G_ECU 22 thus regulates the intake air volume of the engine and generates a desired engine output. Also, the E/G_ECU 22 outputs a signal of detected accelerator position and other signals from various sensors to the main_ECU 14.

T/M_ECU 23 is coupled on the output side thereof to a hydraulic control circuit 33. The T/M_ECU 23 is coupled on the input side thereof to various sensors including a shift position sensor (not illustrated). On the basis of a signal of engine torque estimated by the E/G_ECU 22 or detection signals from various sensors, the T/M_ECU 23 performs hydraulic control for the hydraulic control circuit 33. This allows the T/M_ECU 23 to operate frictionally engaged elements and pulleys in the automatic transmission, and change the engine output at a desired transmission gear ratio.

The T/M_ECU 23 outputs a signal of detected shift position and other signals from various sensors to the main_ECU 14.

The BK_ECU 24 is coupled on the output side thereof to a brake actuator 34 for regulating the brake hydraulic pressure output to a brake wheel cylinder on each wheel. The BK_ECU 24 is coupled on the input side thereof to various sensors, such as a brake pedal sensor, a yaw rate sensor, front and rear acceleration sensors, and a vehicle speed sensor (not illustrated).

The BK_ECU 24 drives and controls the brake actuator 34 on the basis of a control signal from the main_ECU 14 or detection signals from various sensors. The BK_ECU 24 thus appropriately produces brake force in each wheel for forced braking control or yaw rate control of the vehicle M.

The BK_ECU 24 outputs signals of brake operation state, yaw rate, forward and backward acceleration, and vehicle speed (speed of the vehicle M) detected by various sensors to the main_ECU 14.

The PS_ECU 25 is coupled on the output side thereof to an electric power steering motor 35 that applies a steering torque of motor rotation to a steering mechanism. Also, the PS_ECU 25 is coupled on the input side thereof to various sensors, such as a steering torque sensor and a steering angle sensor.

The PS_ECU 25 drives and controls the electric power steering motor 35 on the basis of a control signal from the main_ECU 14 or detection signals from various sensors. The PS_ECU 25 thus produces a steering torque for the steering mechanism.

The PS_ECU 25 outputs signals of steering torque and steering angle detected by various sensors to the main_ECU 14.

The locator unit 36 includes a global navigation satellite system (GNSS) sensor 37 and a high-precision road map database (road map DB) 38.

The GNSS sensor 37 receives positioning signals transmitted from positioning satellites to determine the location (including latitude, longitude, and altitude) of the vehicle M.

The road map DB 38 is a mass storage medium, such as a hard disk drive (HDD), and stores high-precision road map information (dynamic map). As lane data used for autonomous driving, the road map DB 38 holds, for example, lane width data, lane center position coordinate data, lane azimuth angle data, and speed limit data.

The lane data is stored, for each lane, at intervals of several meters on the road map. The road map DB 38 holds information about various facilities and parking spaces. For example, on the basis of a request signal from the main_ECU 14, the road map DB 38 outputs road map information of a specified range, with respect to the position of the vehicle M determined by the GNSS sensor 37, as traveling environment information to the main_ECU 14.

In the present embodiment, along with the GNSS sensor 37, the road map DB 38 serves as a traveling environment recognizer that recognizes information about a traveling environment outside the vehicle M.

The left-front lateral sensor 41$lf$ and the right-front lateral sensor 41$rf$ are each constituted by a sensor, such as a light detection and ranging (LiDAR) sensor or a millimeter-wave radar. The left-front lateral sensor 41$lf$ and the right-front lateral sensor 41$rf$ are disposed, for example, on the left and right sides, respectively, of a front bumper.

The left-front lateral sensor 41$lf$ and the right-front lateral sensor 41$rf$ detect three-dimensional objects that cannot be easily recognized in images captured by the stereo camera 11. That is, by the left-front lateral sensor 41$lf$ and the right-front lateral sensor 41$rf$, three-dimensional objects in areas Alf and Arf (see FIG. 2) in front and to the left and right of the vehicle M are recognized as traveling environment information.

The left-front lateral sensor 41$lf$ and the right-front lateral sensor 41$rf$ may be replaced by a single LiDAR sensor that is capable of covering a wide area in front and to the left and right of the vehicle M. A LiDAR sensor capable of covering a wide area in front and to the left and right of the vehicle M may be added to the left-front lateral sensor 41$lf$ and the right-front lateral sensor 41$rf$.

The left-rear lateral sensor 41$lr$ and the right-rear lateral sensor 41$rr$ are each constituted, for example, by a LiDAR sensor or a millimeter-wave radar. The left-rear lateral sensor 41$lr$ and the right-rear lateral sensor 41$rr$ are disposed, for example, on the left and right sides, respectively, of a rear bumper. The left-rear lateral sensor 41$lr$ and the right-rear lateral sensor 41$rr$ detect three-dimensional objects that cannot be easily recognized by the left-front lateral sensor 41$lf$ and the right-front lateral sensor 41$rf$. That is, by the left-rear lateral sensor 41$lr$ and the right-rear lateral sensor 41$rr$, three-dimensional objects in areas Alr and Arr (see FIG. 2) behind and to the left and right of the vehicle M are recognized as traveling environment information.

Each radar analyzes light or wave reflected from objects and mainly detects a three-dimensional object, such as a vehicle running beside the vehicle M. As information about the three-dimensional object, each radar detects, for example, the width of the three-dimensional object, the representative point of the three-dimensional object (i.e., position relative to the vehicle M), and the moving speed of the three-dimensional object. In the present embodiment, as described above, the left-front lateral sensor 41$lf$, the right-front lateral sensor 41$rf$, the left-rear lateral sensor 41$lr$, and the right-rear lateral sensor 41$rr$ each serve as a traveling environment recognizing sensor that recognizes information about a traveling environment outside the vehicle M. The left-front lateral sensor 41$lf$ and the right-front lateral sensor 41$rf$ also constitute a forward environment recognizing device.

The coordinates of each object detected outside the vehicle M are transformed by the main_ECU 14 into coordinates in a three-dimensional coordinate system with the center of the vehicle M at its origin. The coordinates of each object detected outside the vehicle M are included in, for example, traveling environment information recognized by the image recognition_ECU 13, traveling environment information recognized by the locator unit 36, traveling environment information recognized by the left-front lateral sensor 41*lf*, traveling environment information recognized by the right-front lateral sensor 41*rf*, traveling environment information recognized by the left-rear lateral sensor 41*lr*, and traveling environment information recognized by the right-rear lateral sensor 41*rr*.

As driving modes, the main_ECU 14 has a manual driving mode, a first traveling control mode and a second traveling control mode for traveling control, and a minimum risk maneuver (MRM) mode. These driving modes can be selectively switched from one mode to another by the main_ECU 14 on the basis of, for example, an operation performed on the mode selection switch in the HMI 31.

The manual driving mode is a driving mode where the driver holds steering. For example, the manual driving mode is a driving mode that allows the vehicle M to travel in accordance with a driver's driving operation, such as steering operation, accelerator operation, or brake operation.

The first traveling control mode is also a driving mode where the driver holds steering. That is, the first traveling control mode is a so-called semi-autonomous driving mode that mainly combines, while reflecting a driver's driving operation, adaptive cruise control (ACC) with active lane keep centering (ALKC) control and active lane keep bouncing (ALKB) control appropriately in accordance with control by, for example, the E/G_ECU 22, the BK_ECU 24, and the PS_ECU 25 to allow the vehicle M to travel along a target traveling path.

The adaptive cruise control is basically performed on the basis of traveling environment information received from the image recognition_ECU 13. That is, the adaptive cruise control is performed on the basis of, for example, preceding vehicle information included in the traveling environment information from the image recognition_ECU 13.

The active lane keep centering control and the active lane keep bouncing control are basically performed on the basis of traveling environment information received from one or both of the image recognition_ECU 13 and the locator unit 36. That is, the active lane keep centering control and the active lane keep bouncing control are performed on the basis of, for example, lane line information included in the traveling environment information from the image recognition_ECU 13 or the locator unit 36.

The second traveling control mode is an autonomous driving mode where the driver does not hold steering and performs neither accelerator operation nor brake operation. That is, the second traveling control mode is an autonomous driving mode that mainly combines the adaptive cruise control with the active lane keep centering control and the active lane keep bouncing control appropriately in accordance with control by, for example, the E/G_ECU 22, the BK_ECU 24, and the PS_ECU 25 to allow the vehicle M to travel along a target route (router map information).

The minimum risk maneuver mode is a mode where if, for example, current traveling in the second traveling control mode becomes unable to continue and the driving operation cannot be passed to the driver, the vehicle M is automatically brought to a stop on a side strip of the road, with hazard lights on.

Passing the driving operation to the driver refers to, for example, transition to the manual driving mode or to the first traveling control mode.

As described above, the minimum risk maneuver mode is a control mode that allows the vehicle M to safely stop when the driving operation of the vehicle M cannot be passed from the system to the driver due to, for example, a drop in driver's alertness.

Figure 3:
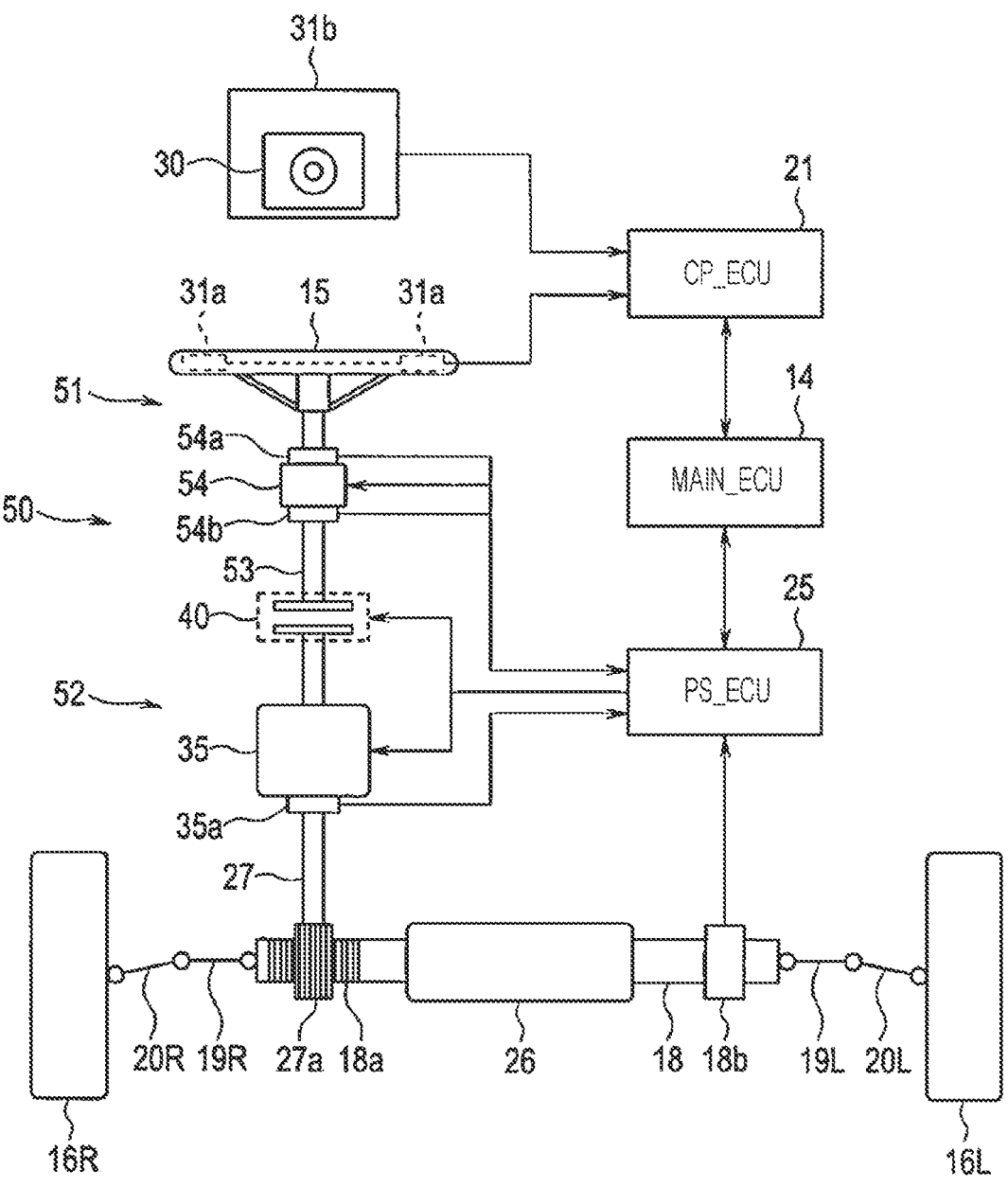
FIG. 3 is a schematic diagram illustrating a configuration of an electric power steering device and a driver monitoring system.

A steering mechanism of an electric power steering device 50 will now be described. As illustrated in FIG. 3, the electric power steering device 50 includes a steering mechanism 51 and a turning mechanism 52 that turns wheels 16R and 16L. The steering mechanism 51 receives a steering input from a steering handle (steering wheel) 15 held by the driver.

The steering mechanism 51 and the turning mechanism 52 are separate (or unlinked) and are controlled in a predetermined ganged manner by the PS_ECU 25. This allows the electric power steering device 50 to serve as a so-called steer-by-wire device that has no mechanical coupling between the steering handle 15 and the wheels 16R and 16L.

The steering mechanism 51 includes the steering handle 15, a steering shaft 53 coupled to the steering handle 15, and a reaction force motor 54 coaxially disposed in the steering shaft 53 and serving as a resistance applicator.

The reaction force motor 54 is driven and controlled by the PS_ECU 25. The driving force of the reaction force motor 54 is transmitted through the steering shaft 53 to the steering handle 15.

The turning mechanism 52 includes a rack shaft 18 extending in the right and left direction of a vehicle body, and knuckle arms 20R and 20L coupled to respective ends of the rack shaft 18, with a tie rod 19R interposed between the knuckle arm 20R and the rack shaft 18 and a tie rod 19L interposed between the knuckle arm 20L and the rack shaft 18. The knuckle arms 20R and 20L are coupled to the wheels 16R and 16L, respectively.

The rack shaft 18 is supported in such a way that it can be moved, through a housing 26, in the right and left direction of the vehicle M. The rack shaft 18 has a rack 18*a*.

The rack 18*a* engages with a pinion 27*a*. The pinion 27*a* is coupled to a pinion shaft 27.

The electric power steering motor 35 serving as a turning motor is coaxially disposed in the pinion shaft 27. The electric power steering motor 35 is driven and controlled by the PS_ECU 25.

The driving force of the electric power steering motor 35 is transmitted through the pinion shaft 27, the pinion 27*a*, and the rack 18*a* to the rack shaft 18. This turns the wheels 16R and 16L.

A clutch mechanism 40 is interposed between the steering shaft 53 and the pinion shaft 27. The clutch mechanism 40 is fastened and controlled by the PS_ECU 25 when, for example, the reaction force motor 54 or the electric power steering motor 35 malfunctions.

The PS_ECU 25 is coupled, for example, to a steering angle sensor 54*a*, a steering torque sensor 54*b*, a wheel angle sensor 18*b*, and a reaction torque sensor 35*a*.

The steering angle sensor 54*a* detects the steering angle of the steering handle 15 operated by the driver. The steering torque sensor 54*b* detects the steering torque of the steering handle 15 operated by the driver. The steering handle 15 has the steering touch sensor 31*a*.

The wheel angle sensor 18*b* detects the turning angle (wheel angle) of the wheels 16R and 16L. The reaction torque sensor 35*a* detects a reaction torque from the road surface to the wheels 16R and 16L.

On the basis of an input from each sensor, the PS_ECU 25 drives and controls the reaction force motor 54 and the electric power steering motor 35, with a predetermined relation therebetween. That is, on the basis of any predetermined relation, the PS_ECU 25 performs ganged control (steer-by-wire control) of the steering mechanism 51 and the turning mechanism 52 which are unlinked.

The DMS 31*b* includes an in-vehicle camera 30. The in-vehicle camera 30 is mounted, for example, in a center visor on an instrument panel and configured to recognize the driver's face.

The DMS 31*b* receives driver information that includes, for example, the levels of drowsiness, alertness, and distraction determined on the basis of the conditions of driver's face and line of sight captured by the in-vehicle camera 30. The DMS 31*b* outputs the driver information to the CP_ECU 21.

While described in detail below, if a drop in driver's alertness is detected, the driving support apparatus 1 configured as described above suspends the ganged control of the steering mechanism 51 and the turning mechanism 52 until restoration of alertness is detected.

The driving support apparatus 1 then executes the second traveling control mode which is an autonomous driving mode that appropriately combines the adaptive cruise control with the active lane keep centering control and the active lane keep bouncing control to allow the vehicle M to travel along a traveling route.

In the present embodiment, a drop in driver's alertness is detected under the following conditions.

From the positional relation of the vehicle M to the traveling path, the driving support apparatus 1 continuously detects the amount of movement of the vehicle M in the vehicle width direction, performs frequency conversion of the detected amount of movement to determine each frequency component power, and monitors the driver's alertness on the basis of the frequency component power to allow the main_ECU 14 to detect a drop in driver's alertness. A technique used to detect a drop in driver's alertness is known, and thus will not be described in detail.

In addition to detection based on the vehicle's behavior described above, the driving support apparatus 1 monitors changes in driver's biological information, such as driver's line-of-sight direction, blinks, and opening and closing of eyelids captured by the in-vehicle camera 30 in the DMS 31*b*, to allow the main_ECU 14 to detect a drop in driver's alertness.

A drop in driver's alertness may be detected by using, for example, a vital sensor in the DMS 31*b*, the driving seat (driver's seat), or a watch with wireless communication capabilities to monitor changes in biological information, such as driver's heart rate, autonomic nervous activity, brain waves, or skin potential activity.

The steering touch sensor 31*a* may monitor the driver's grip on the steering handle 15 to allow the main_ECU 14 to detect a drop in driver's alertness. The main_ECU 14 may perform an overall evaluation of the results of various types of detection to determine a drop in driver's alertness.

Figure 4:
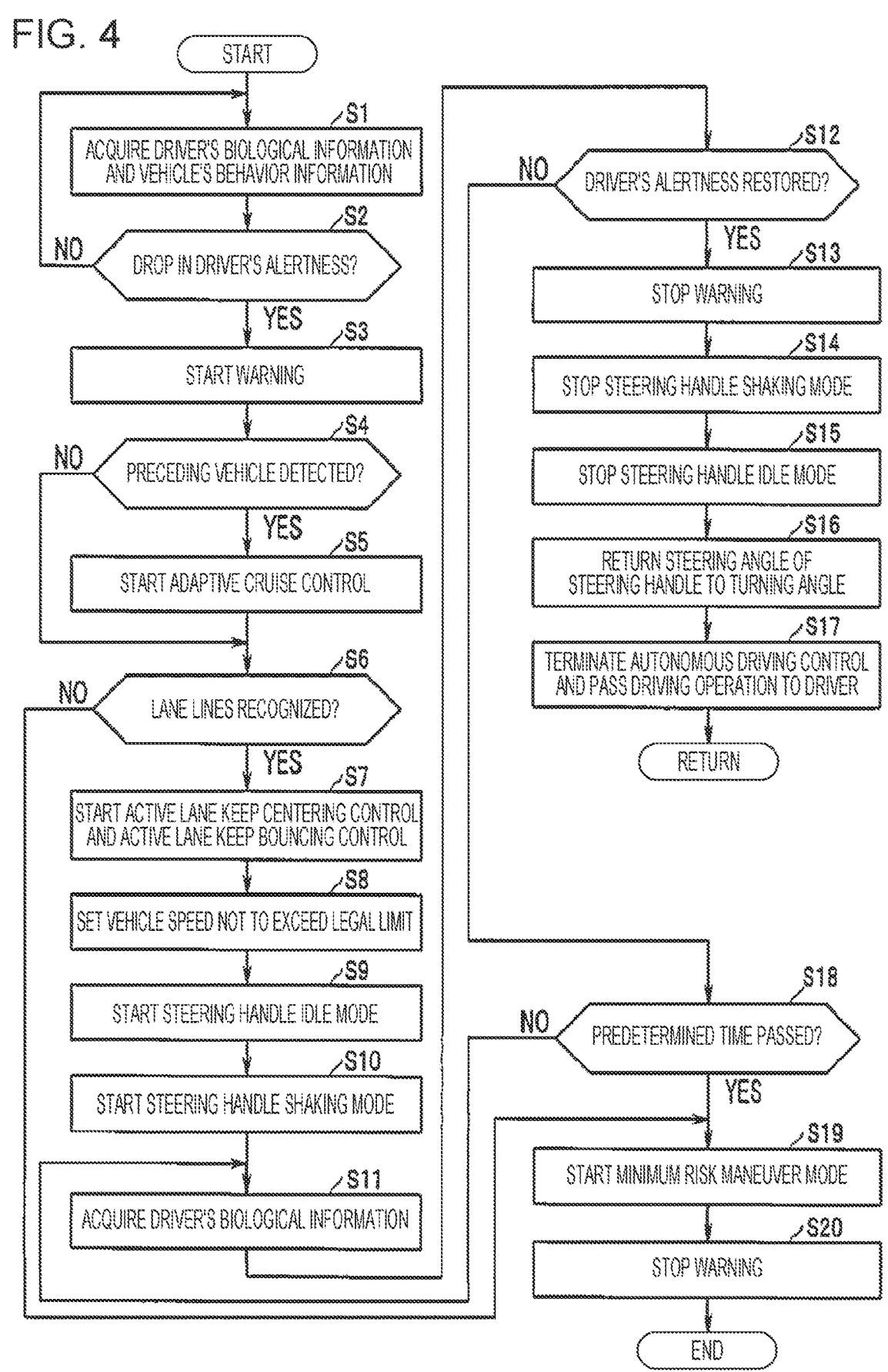
FIG. 4 is a flowchart illustrating an example of control executed by the vehicle driving support apparatus.

An example of control based on a routine illustrated in the flowchart of FIG. 4 will now be described. The control is executed by the driving support apparatus 1.

During traveling of the vehicle M, the main_ECU 14 of the driving support apparatus 1 acquires biological information of the driver (driver's biological information) and behavior information of the vehicle M (vehicle's behavior information) (S1). Here, for example, the main_ECU 14 acquires driver's biological information output from the DMS 31*b* to the CP_ECU 21. The main_ECU 14 also requires vehicle's behavior information, such as the amount of continuous movement of the vehicle M in the vehicle width direction.

From the driver's biological information acquired, the main_ECU 14 determines whether the driver's alertness has dropped (S2). Here, the main_ECU 14 determines whether the driver's alertness has dropped on the basis of changes in driver's biological information, such as driver's line-of-sight direction, blinks, and opening and closing of eyelids, the driver's grip on the steering handle 15, and the behavior of the vehicle M.

If the driver's alertness has dropped, the main_ECU 14 starts warning (S3). For example, the main_ECU 14 causes the CP_ECU 21 to drive and control the DMS 31*b*, emits a warning sound from the alarm 31*c*, outputs a warning announcement through the speaker, and displays a warning or an attention-attracting message on the display or the combination meter. A device that outputs a warning announcement through the speaker, and a device that presents a warning on the display or the combination meter, are included in the warning device.

If the driver's alertness is not low, the main_ECU 14 returns to step S1 and acquires the driver's biological information again.

After the start of warning in step S3, the main_ECU 14 determines whether the preceding vehicle is detected (S4). Here, the main_ECU 14 determines the presence of the preceding vehicle on the basis of preceding vehicle information, which is included in the traveling environment information received from the image recognition_ECU 13.

If the preceding vehicle is detected, the main_ECU 14 starts the adaptive cruise control (S5). Here, the main_ECU 14 causes the vehicle M to follow the preceding vehicle while maintaining a predetermined distance thereto, on the basis of the traveling environment information received from the image recognition_ECU 13.

If the preceding vehicle is not detected in step S4, the main_ECU 14 determines whether lane lines are recognized (S6).

Here, the main_ECU 14 determines the presence of lane lines on the basis of, for example, lane line information included in the traveling environment information received from the image recognition_ECU 13 or the locator unit 36. If lane lines are not recognized, the main_ECU 14 goes to step S19 described below.

If lane lines are recognized, the main_ECU 14 starts the active lane keep centering control and the active lane keep bouncing control in an appropriately combined manner (S7). That is, the main_ECU 14 executes the second traveling control mode (autonomous driving control) where the driver does not hold steering and performs neither accelerator operation nor brake operation.

To execute the second traveling control mode, the main_ECU 14 sets the speed of the vehicle M not to exceed the legal limit (S8). That is, if the speed of the vehicle M exceeds the legal limit, the main_ECU 14 changes the set vehicle speed to the legal limit, whereas if the speed of the vehicle M does not exceed the legal limit, the main_ECU 14 keeps the speed (or may change the speed to the legal limit).

If lane lines are not recognized in step S6, the main_ECU 14 starts the steering handle idle mode (S9). Here, the main_ECU 14 causes the PS_ECU 25 to perform control that stops the reaction force motor 54 from applying resistance to the steering shaft 53, so as to free (or idle) the steering shaft 53 and stop the ganged control of the steering mechanism 51 and the turning mechanism 52.

The steering mechanism 51 thus enters a state where a steering input from the steering handle 15 coupled to the steering shaft 53 does not function. The steering handle 15 is thus in an idle state where no resistance is applied thereto.

Figure 5:
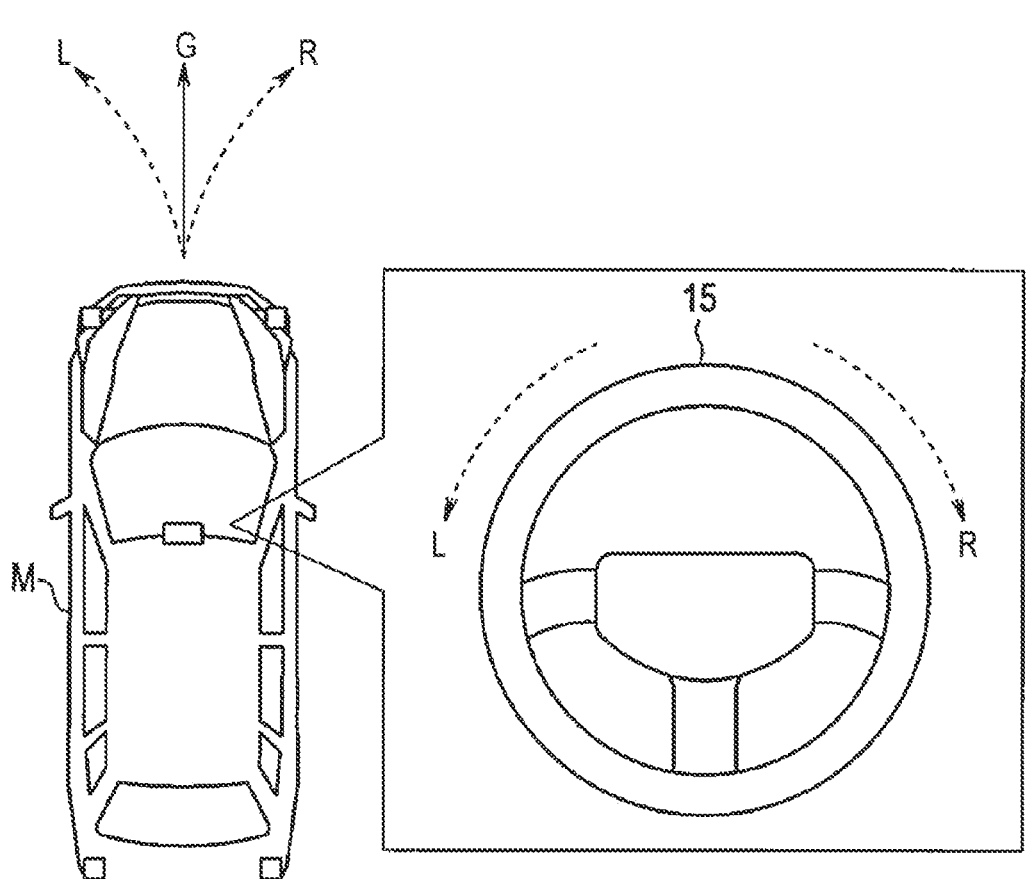
FIG. 5 is a schematic diagram of a vehicle and a steering handle.

That is, as illustrated in FIG. 5, even when the steering handle 15 is turned right R or left L as indicated by a broken line, the vehicle M does not turn right R or left L as indicated by a broken line. Instead, for example, the vehicle M is controlled to follow the preceding vehicle or travel along a traveling path G (or lane center) indicated by a solid line.

Figure 6:
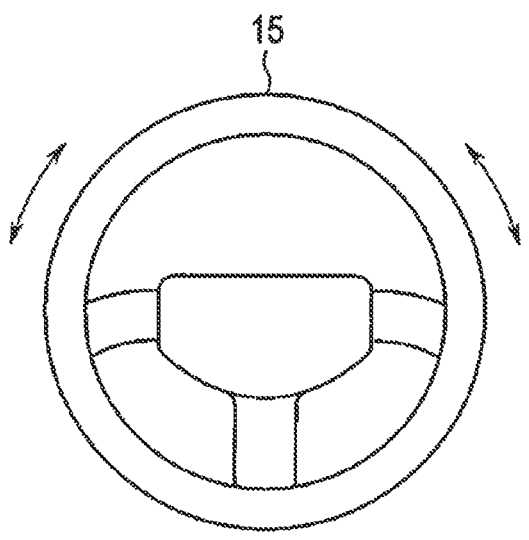
FIG. 6 is a plan view of the steering handle in shaking mode.

Next, the main_ECU 14 starts the steering handle shaking mode which is an attention-attracting mode (S10). Here, the main_ECU 14 causes the PS_ECU 25 to perform control that drives the reaction force motor 54 in such a way that the steering shaft 53 quickly moves to the right and left. The main_ECU 14 thus shakes the steering handle 15 coupled to the steering shaft 53, as illustrated in FIG. 6. This makes the driver recognize that steering is not functioning due to a drop in his or her alertness.

The steering handle 15 may vibrate in the attention-attracting mode. A control mechanism that shakes or vibrates the steering handle 15 to attract driver's attention is included in the warning device.

The main_ECU 14 acquires driver's biological information again (S11). From the driver's biological information, the main_ECU 14 determines whether the driver's alertness has been restored (S12).

Here, the main_ECU 14 acquires the driver's biological information and determines whether the driver's alertness has been restored on the basis of changes in biological information, such as driver's line-of-sight direction, blinks, and opening and closing of eyelids, and the driver's grip on the steering handle 15.

If the driver's alertness has been restored, the main_ECU 14 stops warning (S13). Here, the main_ECU 14 stops warning, such as a warning sound from the alarm 31c in the HMI 31, a warning announcement from the speaker, and an attention-attracting message displayed on the display or combination meter.

Then, the main_ECU 14 stops the steering handle shaking mode (S14) and stops the steering handle idle mode (S15). The main_ECU 14 stops the PS_ECU 25 from driving the reaction force motor 54 that is shaking the steering handle 15. The main_ECU 14 thus allows the reaction force motor 54 to apply resistance to the steering shaft 53 again.

Accordingly, the main_ECU 14 returns the steering angle of the steering handle 15 to the turning angle of the wheels 16R and 16L (S16). Here, the main_ECU 14 drives the reaction force motor 54 in such a way that the steering angle of the steering handle 15 detected by the steering angle sensor 54a is equal to the turning angle (wheel angle) of the wheels 16R and 16L detected by the wheel angle sensor 18b and received by the PS_ECU 25. This restores the ganged control of the steering mechanism 51 and the turning mechanism 52.

If there is a significant difference between the turning angle (wheel angle) of the wheels 16R and 16L and the steering angle of the steering handle 15, the main_ECU 14 turns the steering handle 15 stepwise or gradually, instead of abruptly, to make the steering angle equal the turning angle (wheel angle).

Then, the main_ECU 14 terminates the autonomous driving control in the second traveling control mode to pass the driving operation to the driver (S17) and returns to step S1. If the driver's alertness has not been restored in step S12, the main_ECU 14 determines whether a predetermined period of time has passed (S18). Until a predetermined period of time has passed in step S18, the process keeps returning to step S11 and the routine is executed repeatedly.

If a predetermined period of time has passed in step S18 before the driver's alertness is restored in step S12, the main_ECU 14 starts the minimum risk maneuver mode described above (S19). Here, for example, the main_ECU 14 automatically brings the vehicle M to a stop on a side strip of the road, with hazard lights on. Then, the main_ECU 14 stops warning (S20) and terminates the control routine.

If the preceding vehicle is not detected in step S4 and lane lines are not recognized in step S6, the main_ECU 14 starts the minimum risk maneuver mode in step S19.

As described above, if a drop in driver's alertness has been recognized, the driving support apparatus 1 of the vehicle M switches the traveling control of the vehicle M to the autonomous driving mode (second traveling control mode) and cancels the steer-by-wire control by the electric power steering device 50 to idle the steering handle 15. The driving support apparatus 1 of the vehicle M thus executes control that prevents the driver from steering and attracts the driver's attention to a drop in his or her alertness while maintaining the normal traveling behavior of the vehicle M.

The driving support apparatus 1 of the vehicle M shakes the steering handle 15, for example, to attract the driver's attention to a drop in his or her alertness. When the driving support apparatus 1 of the vehicle M recognizes that the driver's alertness has been restored to a normal level, the driving support apparatus 1 restores the application of a reaction torque to the steering handle 15. That is, the driving support apparatus 1 of the vehicle M causes the electric power steering device 50 to restore the steer-by-wire control and allows the driver to manually drive the vehicle M again.

The driving support apparatus 1 of the vehicle M may have an intermediate state (shared control) in the process of passing various authorities for controlling the vehicle M from the system to the driver.

In the shared control, for example, when the steering handle 15 returns from the idle state to the normal state where it can receive a steering input, the system adds the rotation torque of the reaction force motor 54 to the steering handle 15 so as to make the steering angle of the steering handle 15 equal to the turning angle (wheel angle) of the wheels 16R and 16L. Thus, while allowing the driver to steer again, the driving support apparatus 1 executes control that supports returning of the steering handle 15 to the normal state.

For execution of the idle mode that idles the steering handle 15, the driver's operation is to be immediately stopped. It is thus desirable, in this case, that the driving support apparatus 1 of the vehicle M do not allow the shared control to function.

The present embodiment illustrates the electric power steering device 50 of steer-by-wire type that includes the steering mechanism 51 and the turning mechanism 52. The steering mechanism 51 receives the steering angle of the steering handle 15, and the turning mechanism 52 turns the wheels 16R and 16L. However, the electric power steering device 50 is not limited to this. The electric power steering device 50 may have a structure where a steering shaft of a typical steering mechanism has a clutch mechanism to interrupt the transmission of turning of the steering shaft to idle the steering handle 15.

When a large reaction torque is to be applied to the steering handle 15 to return the steering angle of the steering handle 15 to the turning angle (wheel angle) of the wheels 16R and 16L, for example, the driving support apparatus 1 of the vehicle M may request the driver to temporarily keep hands off the steering handle 15 and may give an audio announcement to request the driver to grasp the steering handle 15 after returning the steering angle.

The ECUs 13, 14, and 21 to 25 in the driving support apparatus 1 of the vehicle M each include a processor that includes a central processing unit (CPU) and storage devices, such as a read-only memory (ROM) and a random-access memory (RAM). All or some components of circuits of the processor may be implemented by software. For example, various programs corresponding to functions, stored in the ROM, may be read and executed by the CPU.

All or some functions of the processor may be constituted by a logic circuit or an analog circuit, and various programs may be processed by an electronic circuit, such as a field-programmable gate array (FPGA).

The disclosure is not limited to the described embodiments, and may be variously modified in the implementation phase without departing from the scope of the disclosure. The embodiments described above include various stages of the disclosure, and various disclosures may be made by appropriately combining constituent elements disclosed herein.

For example, even if some constituent elements described in the embodiments are removed, the resulting components can still constitute the disclosure, as long as the problems described above can be solved and the effects described above can be achieved.

The invention claimed is:

1. A vehicle driving support apparatus comprising:
   a forward environment recognizing device configured to recognize a traveling environment forward of a vehicle;
   a control device configured to perform adaptive cruise control and active lane keep centering control based on the traveling environment recognized by the forward environment recognizing device;
   an electric power steering device configured to control a turning angle of wheels of the vehicle in accordance with a steering angle received from a steering handle of the vehicle; and
   a driver monitoring system configured to detect changes in biological information of a driver who drives the vehicle, the biological information including at least one of a gaze direction, blinking, and an eyelid opening and closing state of the driver,
   wherein the control device is configured, in response to the driver monitoring system detecting a drop in alertness of the driver based on the changes in biological information, to perform the adaptive cruise control and the active lane keep centering control and to execute a steering handle idle mode,
   wherein the steering handle idle mode is a mode in which the electric power steering device neither changes the turning angle of the wheels based on the steering angle of the steering handle nor provides steering feedback to the driver, and the steering handle is permitted to rotate freely without resistance or feedback,
   wherein the electric power steering device is a steer-by-wire device comprising:
      a steering mechanism configured to translate a steering input from the driver through a steering wheel into a directional control signal for wheels, while simulating steering feedback to the driver by providing responsive resistance; and
      a turning mechanism configured to manage a physical rotation of the wheels to change a direction of the vehicle, in response to the directional control signal,
   wherein the control device is further configured, in the steering handle idle mode, to control the steer-by-wire device withhold the steering feedback to the driver to allow the steering wheel to idle freely, wherein the electric power steering device includes a steering handle of the vehicle, a steering shaft coupled to the steering handle, and a reaction force motor coaxially disposed in the steering shaft,
   wherein the reaction force motor is configured to apply resistance to the steering shaft during traveling of the vehicle,
   wherein the steering handle idle mode is the mode in which the control device causes the reaction force motor to stop applying the resistance to the steering shaft such that no resistance is applied from the reaction force motor to the steering handle, and
   wherein the control device is further configured, in response to the driver monitoring system detecting restoration of the alertness of the driver based on the changes in the biological information while the steering handle idle mode is being executed, to cause the reaction force motor to start applying the resistance to the steering shaft again.

2. The vehicle driving support apparatus according to claim 1, wherein the control device is configured such that, when the driver monitoring system detects the drop in alertness of the driver, the control device drives and controls the electric power steering device, and executes an attention-attracting mode that shakes or vibrates the steering handle.

3. The vehicle driving support apparatus according to claim 1, wherein
   the control device further comprises a warning device configured to warn the driver,
   the control device is configured to:
      drive the warning device when the driver monitoring system detects the drop in the alertness of the driver, and
      when the driver monitoring system detects restoration of the alertness of the driver, stop the warning device, restore the electric power steering device to controlling the turning angle of the wheels in accordance with the steering angle of the steering handle, and terminate the adaptive cruise control and the active lane keep centering control.

4. The vehicle driving support apparatus according to claim 2, wherein
   the control device further comprises a warning device configured to warn the driver,
   the control device is configured to:
      drive the warning device when the driver monitoring system detects the drop in the alertness of the driver, and
      when the driver monitoring system detects restoration of the alertness of the driver, stop the warning device, restore the electric power steering device to controlling the turning angle of the wheels in accordance with the steering angle of the steering handle, and terminate the adaptive cruise control and the active lane keep centering control.

5. The vehicle driving support apparatus according to claim 3, wherein the control device is configured to execute a minimum risk maneuver mode when the alertness of the driver is not restored even after a predetermined period of time has passed, the minimum risk maneuver mode being a mode that brings the vehicle to a stop on a side strip of a road.

6. The vehicle driving support apparatus according to claim 4, wherein the control device is configured to execute a minimum risk maneuver mode when the alertness of the driver is not restored even after a predetermined period of time has passed, the minimum risk maneuver mode being a mode that brings the vehicle to a stop on a side strip of a road.

7. A vehicle driving support apparatus comprising:

a sensor configured to recognize a traveling environment forward of a vehicle;

an electric power steering device configured to control a turning angle of wheels of the vehicle in accordance with a steering angle received from a steering handle of the vehicle;

circuitry configured to perform adaptive cruise control and active lane keep centering control based on the traveling environment recognized by the sensor, detect changes in biological information of a driver who drives the vehicle, the biological information including at least one of a gaze direction, blinking, and an eyelid opening and closing state of the driver, and in response to the driver monitoring system detecting a drop in alertness of the driver based on the changes in biological information, perform the adaptive cruise control and the active lane keep centering control and execute a steering handle idle mode, wherein the steering handle idle mode is a mode in which the electric power steering device neither changes the turning angle of the wheels based on the steering angle of the steering handle nor provides steering feedback to the driver, and the steering handle is permitted to rotate freely without resistance or feedback, wherein the electric power steering device is a steer-by-wire device comprising:

a steering mechanism including a steering wheel and configured to translate a steering input from the driver through the steering wheel into a directional control signal for wheels, while simulating steering feedback to the driver by providing responsive resistance; and a turning mechanism including arms respectively coupled to the wheels and configured to manage a physical rotation of the wheels to change a direction of the vehicle, in response to the directional control signal, wherein the circuitry is further configured, in the steering handle idle mode, to control the steer-by-wire device withhold the steering feedback to the driver to allow the steering wheel to idle freely, wherein the electric power steering device includes a steering handle of the vehicle, a steering shaft coupled to the steering handle, and a reaction force motor coaxially disposed in the steering shaft, wherein the reaction force motor is configured to apply resistance to the steering shaft during traveling of the vehicle, wherein the steering handle idle mode is the mode in which the circuitry causes the reaction force motor to stop applying the resistance to the steering shaft such that no resistance is applied from the reaction force motor to the steering handle, and wherein the circuitry is further configured, in response to the driver monitoring system detecting restoration of the alertness of the driver based on changes in the biological information while the steering handle idle mode is being executed, to cause the reaction force motor to start applying the resistance to the steering shaft again.

8. The vehicle driving support apparatus according to claim 1, wherein the driver monitoring system is configured to detect, based on monitoring a grip of the driver on the steering handle using a steering touch sensor of the vehicle, the drop in alertness of the driver and restoration of the alertness of the driver.

9. The vehicle driving support apparatus according to claim 7, wherein the circuitry is configured to detect, based on monitoring a grip of the driver on the steering handle using a steering touch sensor of the vehicle, the drop in alertness of the driver and restoration of the alertness of the driver.

* * * * *